J. MAZER.
MACHINE FOR MAKING PLASTIC BLOCKS.
APPLICATION FILED DEC. 15, 1920.
1,437,537.
Patented Dec. 5, 1922.
2 SHEETS—SHEET 1.
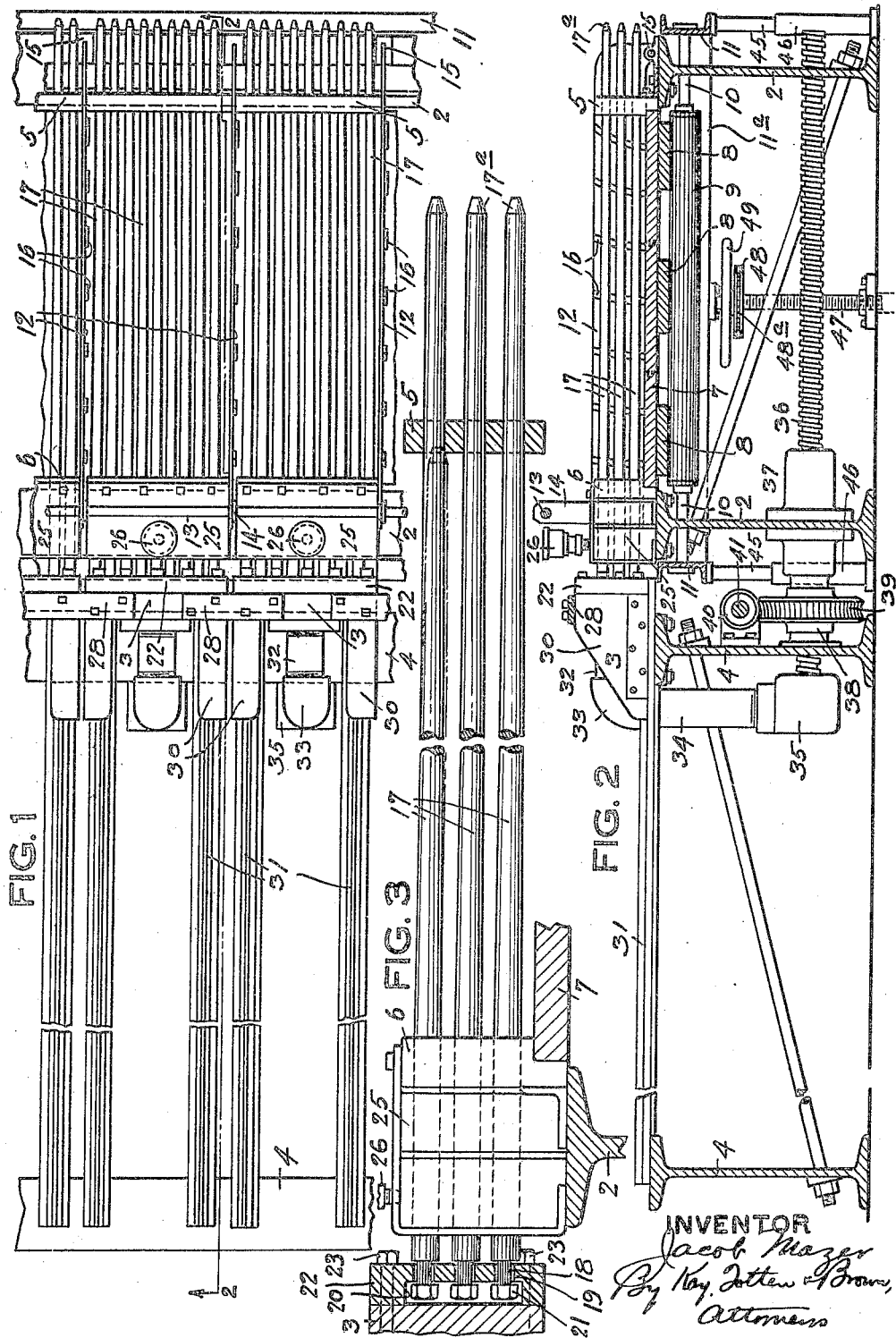
INVENTOR
Jacob Mazer
By Kay, Totten & Brown,
Attorneys

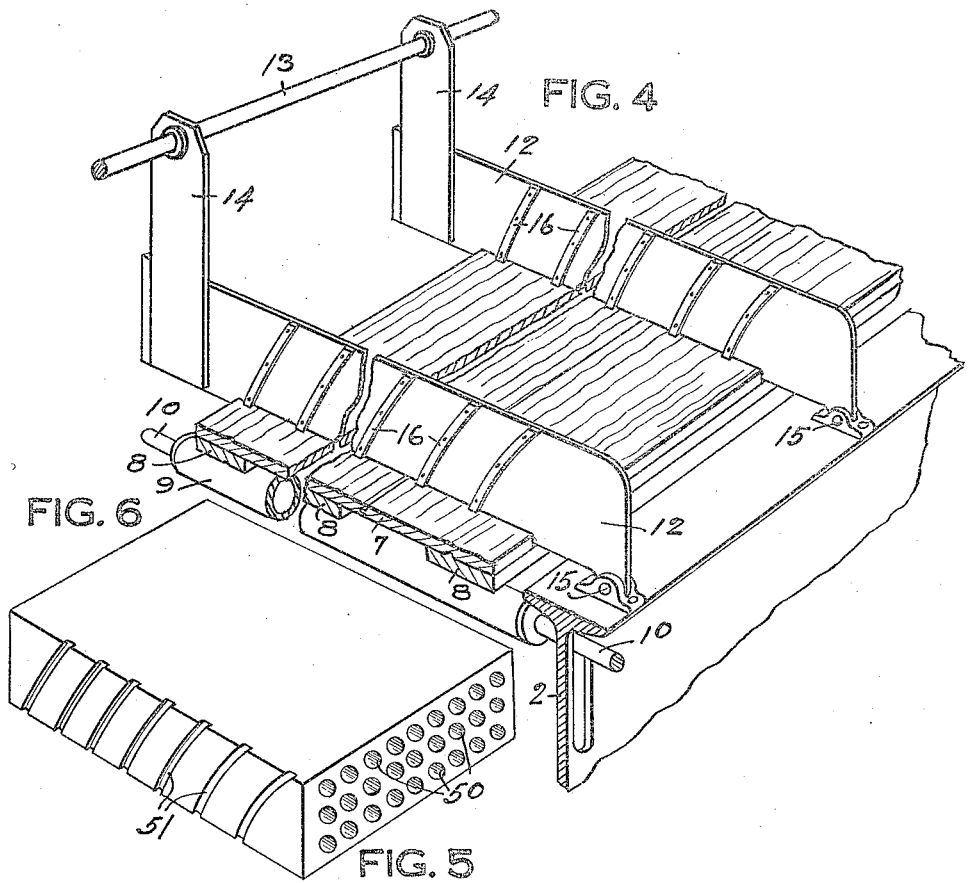
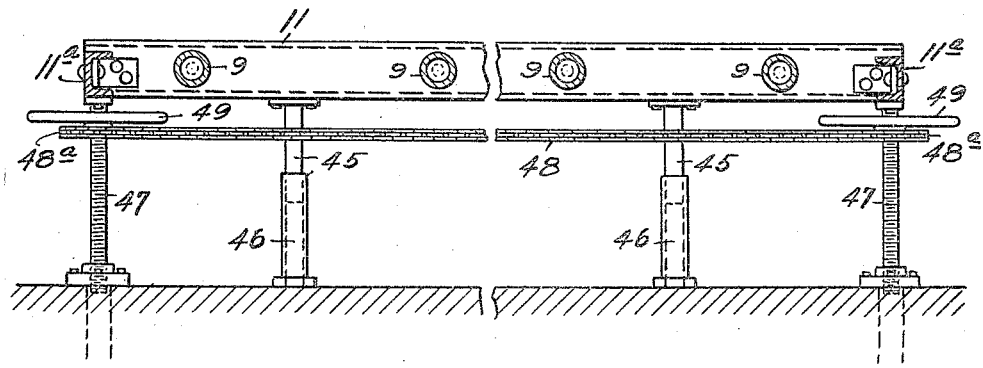

Patented Dec. 5, 1922.

1,437,537

UNITED STATES PATENT OFFICE.

JACOB MAZER, OF PHILADELPHIA, PENNSYLVANIA.

MACHINE FOR MAKING PLASTIC BLOCKS.

Application filed December 15, 1920. Serial No. 430,924.

*To all whom it may concern:*

Be it known that I, JACOB MAZER, a citizen of the United States, and resident of Philadelphia, in the county of Philadelphia and State of Pennsylvania, have invented a new and useful Improvement in Machines for Making Plastic Blocks; and I do hereby declare the following to be a full, clear, and exact description thereof.

My invention relates to the manufacture of molded blocks, particularly partition blocks made of plaster of Paris and known in the art as gypsum blocks or plaster blocks.

One object of my invention is to provide means for making blocks of quick-setting material, such as plaster of Paris, wherein the blocks may be provided with any suitable number of openings, the machine being provided with novel means for supporting and operating the cores which form the openings and for withdrawing all of the cores simultaneously without damage to the blocks.

Another object of my invention is to provide improved means for making blocks composed of quick-setting material and having a large number of small openings extending through the blocks, whereby the blocks shall have high-sound-insulating and heat-insulating value, and shall at the same time be stronger than ordinary blocks having a small number of apertures of large size, by reason of the homogeneous cross section produced by the use of numerous small and tube-like apertures.

The molding of blocks from plaster of Paris and other quick-setting molding materials is attended with considerable difficulty when it is desired to employ removable cores, and particularly those of small diameter and with little or no taper, because the plaster changes almost instantaneously from its initial paste-like condition to a solid and brittle condition without any appreciable interval of plasticity. Therefore, as soon as the molded block is firm enough for the cores to be withdrawn it is so hard and brittle that any lateral movement of the cores will result either in breaking the plaster or in causing the cores to stick tightly.

Plaster blocks for use in constructing walls and partitions are preferably made with several openings extending through the blocks, and for this purpose they are molded or cast around a suitable number of parallel cores which are made somewhat tapering in order to facilitate their removal. In practice, the several cores in a given block can never be perfectly parallel and therefore, if all of the cores are pulled out together, for example by means of a head engaging all of the cores and moving in a straight line, the individual cores will be drawn in directions which do not coincide exactly with the original axes of the cores. Consequently, the cores are caused to jam in the blocks and the blocks are frequently broken or weakened. For this reason, in order to eliminate internal weakening stresses, it has heretofore been necessary to withdraw each of the cores separately and, since this is usually done by hand, the manufacture of plaster blocks is slow and expensive.

My present invention provides for simultaneously drawing any suitable number of cores from a plaster block or from a series of such blocks, while permitting each individual core to have a certain amount of independent movement so that each core can adjust itself with respect to the drawing head and will be withdrawn in correct line with the position which it originally occupied in the block, even though the cores may not be exactly parallel. To this end, I provide a movable head in which one end of each core is loosely held, each core having both swivelled and universal movement with respect to the head. That is to say, the core is free to turn about its own axis, to move slightly lengthwise with respect to the head and also to tilt slightly in any direction. This universal movement is so limited that the cores are always substantially parallel and the machine also includes means for operating the sliding head, for molding the blocks in multiple, and for conveniently removing the blocks after they are completed.

The accompanying drawing shows a machine constructed in accordance with my invention. Fig. 1 is a plan view of a portion of a multiple molding machine showing two of the molds with their cores and core-operating mechanism; Fig. 2 is a side elevational view, with parts in section, of one of the molds shown in Fig. 1, the section being taken substantially along the line 2—2, Fig. 1; Fig. 3 is an enlarged longitudinal sectional view showing one of the sets of cores with their operating head; Fig. 4 is a perspective view of one of the molds, showing the partition plate construction; Fig. 5 is a side elevational view of the frame which supports the mold bottoms; and Fig. 6 is a perspective view of one form of block produced by the machine.

As shown, the machine consists of a series of molds carried upon suitable supports 2 and a corresponding number of core-operating heads 3 carried upon similar supports 4. The supports 2 and 4 may suitably consist of I-beams extending the full length of the battery of molds. The full sized battery which I have designed contains 20 of these molds but of course there may be a greater or less number.

Each of the molds consists of a stationary front plate 5, a stationary rear plate 6, and a bottom 7, suitably composed of matched boards and carried by planks 8 which rest on rollers 9 that are loosely carried on shafts 10 supported in a frame 11 consisting of channel bars which extend the full length of the machine together with suitable transverse bars 11ᵃ. The frame 11 is provided with suitable means for raising and lowering it so that when a set of blocks is completed all of the mold bottoms may be lowered by lowering the frame 11, and the blocks removed by sliding the planks 8 along the rollers 9. The means which I prefer to employ for thus raising and lowering the frame 11 is described in detail below.

The sides of the molds are formed of plates 12 set on edge and connected by means of a rod 13 which preferably extends through extensions 14 secured to the plates 12. All of the plates 12 may be placed in position and removed together. To this end, each plate 12 is hinged to the adjacent support 2 as shown at 15. In order to mold grooves in the edges of the blocks, the plates 12 are provided with curved strips 16, suitably of metal, which all have the same center of curvature, but have different lengths of radius. The center of this curvature is the center of the hinges 15, so that when the partition plates are swung upward, the projections 16 readily leave the molded grooves.

The front and rear plates 5 and 6 are provided with openings to receive a suitable number of cores 17. As shown in the drawing each mold is provided with three rows of ten cores each, giving thirty apertures for each block. The outer end of each core is pointed, as shown at 17ᵃ to facilitate its entry into the proper opening in the plate 5 and the rear end of each core is attached to the drawing head 3 in the manner shown in Fig. 3. As shown, the end of each core is turned down to form a neck 18 which extends through the opening 19 into a socket 20. The end of the neck 18 which projects into the socket 20 is threaded to receive a nut 21. To facilitate assembly, the head 3 is provided with a removable front plate 22 which is recessed to form the socket 20 and which is attached to the main portion of the head 3 by means of bolts 23. It will be observed that there is an appreciable clearance between the neck 18 and the opening 19 and also that the distance between the nut 21 and the main portion of the core is somewhat greater than the thickness of the front plate 22. This provides for a limited amount of free lengthwise, sidewise, or tilting movement of the core, and at the same time permits the core to rotate freely on its own axis.

Between the rear plate 6 of the mold and the drawing head 3 is a lubricating and cleaning box 25 having two compartments, one of which contains cotton waste or other oil-absorbent material which surrounds the cores and is fed with oil from an oil cup 26, while the other compartment contains mineral wool, steel wool or similar material for cleaning the cores. By this means the cores are lubricated and cleaned each time that they are withdrawn from the molds and later moved back into the molds.

It will be noted that when the cores are in position in the mold their ends project beyond the front plate 5 a distance which is approximately the same as the distance between the drawing head 3 and the inner face of the rear plate 6. Thus when the cores are withdrawn the whole surface of each core that comes in contact with the plaster in the mold is drawn through the box 25 and the cores are therefore completely cleaned and lubricated during each reciprocating movement.

The additional length given to the cores has the further advantage that the withdrawal of the cores can be begun just before the blocks are set hard enough to stand up without the cores. No two charges of plaster set in precisely the same time. There is always a difference in the time of setting of different batches of plaster and of different shipments of plaster.

It is important that the cores be withdrawn at the earliest possible moment. This can be determined approximately by testing each shipment of plaster, but not accurately enough for best results. It is also important that a slight movement be set up in withdrawing the cores just before the material hardens, and this movement must be of such a gentle nature that it will not weaken the block. I therefore begin to withdraw the cores at a slow rate just before the material sets enough to become self-supporting, and then, after the projecting or extra length of the core has been withdrawn, I withdraw the longer portion of the core at a rapid rate, without straining the block in any manner and with the use of a very small amount of power. This preliminary movement of the core prevents the peculiar characteristic of the plaster of gripping the core just at the moment of setting. This novel method of core-withdrawing is claimed and described in further detail in my copending application for Letters Patent, Serial Number 430,925, filed December 15, 1920.

The drawing heads 3 are connected together by means of rigid links 28 and are provided with side extensions 30 which have slots that engage tracks 31 resting on the supports 4. In order to move the drawing heads along the tracks 31 as a unit, certain of the heads are connected by means of a nipple 32, an elbow 33, and a second nipple 34, to a connection 35 which is carried on the rear end of a screw 36 that is mounted in a bearing 37 carried by one of the supports 2. The screw 36 also extends through the threaded hub 38 of a worm wheel 39 which is driven by means of a worm 40 secured to a shaft 41. The shaft 41 may be rotated at proper intervals, either manually or by means of a suitable motor.

As stated above, the channel bar frame 11 carrying the supporting rollers 9 is arranged to be raised and lowered. For this purpose, the long sides of the channel iron frame 11 rest upon the upper ends of a series of vertical tubes 45 which are telescoped within tubes 46 of larger diameter, the latter resting on the foundation. At the center of each end of the channel iron frame is a screw jack 47 for raising and lowering the frame. These two screw jacks are connected by means of an endless chain 48 and sprockets 48ª and may be operated at either or both ends by means of suitable hand wheels 49.

In the operation of my improved block machine, the cores are assembled in the mold in the position shown in the drawing and the plaster of Paris or other suitable material is poured into the molds and allowed to set. Just before the moment of setting the shaft 41 is turned slowly and, through the power connections just described, the drawing heads 3 are thus moved along the tracks 31 carrying with them the cores 17. After the projecting portions of the cores are withdrawn the speed of the shaft 41 is increased, thus completing the withdrawal more rapidly. During this withdrawal each of the cores adapts itself with respect to the head 3 so as to move along the line of least resistance, that is to say, along the line which it originally occupied in the mold. Therefore, the blocks offer but little resistance to the withdrawal of the cores and each core moves as though it were being withdrawn separately and without reference to the other cores. During this withdrawing movement the cores are cleaned and lubricated as they pass through the box 25.

When the cores are completely withdrawn from the molds, all of the side plates are lifted off as a unit by raising the rods 13 and so turning the plates around the hinges 15, and the channel frame 11 is lowered by means of the jacks 47 to bring the blocks below the level of the front and rear plates 5 and 6, after which the entire series of blocks is rolled away from the machine on the rollers 9 and the blocks are ready to be stored or otherwise handled, as may be desired.

Instead of lowering the frame 11, it may obviously be raised, by means similar to those described above so as to cause the blocks to clear the molds.

After the molded blocks are removed a new set of bottom boards is rolled beneath the molds, the frame 11 is raised to bring the bottom boards into engagement with the front and rear plates, the side plates are again placed in position, and the heads 3 are again moved forward to bring the cores into the molds. On account of the loose connection between the cores and the drawing heads, the cores may droop slightly as indicated in dotted lines in an exaggerated degree on Fig. 3. This movement will in any case be very slight and the pointed shape of the front ends of the cores will enable them to register with the openings in the front plate 5.

Fig. 6 shows one form of block produced by the machine in the manner described above. This block, as shown, has three rows of openings 50 extending through the block, and its edges are provided with curved grooves 51. These grooves are all concentric about a point outside of the block, and since their center of curvature is displaced to one side of the block, the grooves have the effect of extending in different directions, thus producing an effective lock when the blocks are set up in mortar.

One feature of importance in this machine is the extra length of the cores permitting the preliminary withdrawal mentioned above, and another important feature is the loose connection between each core and its drawing head. While this loose connection is necessary in order that the cores may have a certain degree of independent movement, as stated above, this independent movement is always very small as the cores are parallel for all practical purposes. By thus providing for the ready removal of the cores without breaking the blocks or causing the cores to jam I am able to reduce the taper given to the cores, thus making the openings in the blocks nearly uniform in diameter from end to end, which is an advantage when the blocks are used as sound-controlling and heat and cold insulating elements in partitions and like constructions. The blocks produced by this machine are also very light and strong, the large number of apertures serving to reduce the weight of the block and also increasing its strength because of the uniform and short arches formed between the apertures.

While I have shown and described herein a preferred embodiment of my invention, it is to be understood that various changes in the form and arrangement of parts may be made, and I therefore desire that no limitations be imposed on my invention except such as are indicated in the appended claims.

I claim as my invention:

1. In a machine for making blocks, the combination of a mold, a core slidable lengthwise through the said mold, and means for longitudinally moving the said core, the said core being permanent and loosely connected to the said moving means for limited lengthwise and swinging movement with respect to said moving means.

2. In a machine for making blocks the combination of a mold, a core slidable lengthwise through the said mold, and means for longitudinally moving the said core, the said core being rotatable on its longitudinal axis through having a permanent swivelled connection with the said moving means and being capable of limited lengthwise and swinging movement with respect to said moving means.

3. In a machine for making blocks the combination of a mold, a core slidable lengthwise through the said mold, and means for longitudinally moving the said core, the said core having a universal connection with the said moving means.

4. In a machine for making blocks the combination of a mold, a core slidable lengthwise through the said mold, and means permanently connected therewith for longitudinally moving the said core, the said core having a limited amount of swinging movement with respect to the said moving means.

5. In a machine for making blocks the combination of a mold, a core slidable lengthwise through the said mold, and means permanently connected therewith for longitudinally moving the said core, the said core being rotatable and having a limited amount of swinging movement with respect to the said moving means.

6. In a machine for making blocks the combination of a mold, a core slidable lengthwise through the said mold, and means permanently connected therewith for longitudinally moving the said core, comprising a slidable head having a socket formed therein, the said core having a limited amount of swinging movement with respect to the said moving means, and being provided with an enlargement received in the said socket and fitting loosely therein.

7. In a machine for making blocks, the combination of a mold, a core slidable lengthwise through the said mold and having an enlarged end, and means for longitudinally moving the said core, the said moving means comprising a slidable head having a socket formed therein, the said socket having a recess adapted to loosely receive the said enlarged end of the core, and having an opening adapted to loosely surround the core adjacent to the said enlarged end.

8. In a machine for making blocks the combination of a mold, a plurality of cores slidable lengthwise through the said mold, and means for simultaneously moving all of the said cores, each of the said cores being independently and loosely connected to the said moving means.

9. In a machine for making blocks the combination of a mold, a plurality of cores slidable lengthwise through the said mold, and means for simultaneously moving all of the said cores, each of the said cores having an independent and permanent swivelled connection to the said moving means.

10. In a machine for making blocks the combination of a mold, a plurality of cores slidable lengthwise through the said mold, and means for simultaneously moving all of the said cores, each of the said cores having a universal connection to the said moving means.

11. In a machine for making blocks the combination of a mold, a plurality of cores slidable lengthwise through the said mold, and means for simultaneously moving all of the said cores, each of the said cores having a limited amount of swinging movement with respect to the said moving means.

12. In a machine for making blocks the combination of a mold, a plurality of cores slidable lengthwise through the said mold, and means for simultaneously moving all of the said cores, each of the said cores being rotatable on its own axis with respect to said moving means and also having a limited amount of swinging movement with respect to the said moving means.

13. In a machine for making blocks the combination of a mold, a plurality of cores slidable lengthwise through the said mold, and means for simultaneously moving all the said cores, each of the said cores being provided with an enlargement at one end, and the said moving means comprising a slidable head provided with means for loosely engaging the enlarged ends of the said cores.

14. In a machine for making blocks the combination of a mold having stationary end pieces provided with core-receiving openings, cores adapted to move through the said openings, a slidable head, and means for loosely connecting the said cores to the said head whereby each of the said cores is free to rotate on its axis and to swing laterally with respect to the said head and independently of the other cores.

15. In a machine for making blocks the combination of a mold having stationary end pieces provided with core-receiving openings, cores adapted to move through the said openings, a slidable head, means for loosely connecting the said cores to the said head whereby each of the said cores is free to rotate on its axis and to swing laterally with respect to the said head and independently of the other cores, and means for applying lubricant to the said cores.

16. In a machine for making blocks the combination of a mold having stationary end pieces provided with core-receiving openings, cores adapted to move through the said openings, a slidable head, means for loosely connecting the said cores to the said head whereby each of the said cores is free to rotate on its axis and to swing laterally with respect to the said head and independently of the other cores, and means for applying lubricant to the said cores comprising a stationary box surrounding the said cores, absorbent material disposed in the said box, and means for introducing lubricant into the said box.

17. In a machine for making blocks, the combination of a mold, a plurality of cores slidably movable through the said mold and means for simultaneously moving all of the said cores, comprising a slidable head having a loose connection with each of the said cores, a screw shaft, connections between the said head and the said screw shaft, and means for rotating the said screw shaft.

18. In a machine for making blocks the combination of a plurality of molds disposed side by side, a plurality of cores extending through each of the said molds, means for withdrawing all of the said cores simultaneously while permitting each core to have a limited amount of independent movement, supporting boards or the like between the said molds, the said boards being connected so as to be removed and be replaced together, bottom boards disposed beneath the said molds, rollers for supporting the said bottom boards, and means for raising and lowering the said rollers.

19. In a machine for making blocks the combination of a mold having hinged sides and curved groove-forming members carried by the said sides, the said groove-forming members being concentric in curvature with respect to the axis of movement of the said sides.

20. In a machine for making blocks, the combination of a plurality of molds arranged side-by-side, partition plates disposed between the said molds and severally hinged at one end for vertical swinging movement, and curved groove-forming members carried by the said sides, the said groove-forming members being concentric in curvature with respect to the axis of movement of the said partition plates.

In testimony whereof, I the said JACOB MAZER have hereunto set my hand.

JACOB MAZER.

Witnesses:
H. H. CALDWELL,
M. C. ROSLUBLETT.